United States Patent
Shehan et al.

(10) Patent No.: US 9,493,117 B2
(45) Date of Patent: Nov. 15, 2016

(54) VEHICLE BLIND SPOT SYSTEM OPERATION WITH TRAILER TOW

(71) Applicants: Ford Global Technologies LLC, Dearborn, MI (US); Continental Automotive Systems, Inc., Auburn Hills, MI (US)

(72) Inventors: Mark Alan Shehan, Dearborn, MI (US); Kenneth Snarski, Chesterfield, MI (US); Joseph Mackey, Kenockee, MI (US); Douglas McConnell, Rochester Hills, MI (US); Steven Gerd Kanzler, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/509,876

(22) Filed: Oct. 8, 2014

(65) Prior Publication Data

US 2016/0101730 A1    Apr. 14, 2016

(51) Int. Cl.
*B60Q 9/00*    (2006.01)
*G08G 1/16*    (2006.01)
*B60R 1/00*    (2006.01)
*G01S 13/88*    (2006.01)
*G01S 15/88*    (2006.01)
*G01S 13/93*    (2006.01)
*G01S 13/87*    (2006.01)
(Continued)

(52) U.S. Cl.
CPC ............... *B60Q 9/008* (2013.01); *B60R 1/00* (2013.01); *G01S 13/88* (2013.01); *G01S 15/88* (2013.01); *G08G 1/167* (2013.01); *B60R 2300/808* (2013.01); *G01S 13/87* (2013.01); *G01S 15/87* (2013.01); *G01S 2013/9332* (2013.01); *G01S 2013/9364* (2013.01); *G01S 2013/9367* (2013.01); *G01S 2013/9378* (2013.01); *G01S 2013/9385* (2013.01); *G01S 2015/932* (2013.01); *G01S 2015/938* (2013.01); *G08G 1/168* (2013.01)

(58) Field of Classification Search
CPC .............. G08G 1/167; G08G 1/168; B60W 2050/0075; B60T 8/1708; G01S 13/931; G01S 2013/9332
IPC . G08G 1/167, 1/168; B60W 2050/0075; B60T 8/1708; G01S 13/931, 2013/9332
See application file for complete search history.

(56) References Cited

U.S. PATENT DOCUMENTS 4,730,913 A * 3/1988 Boothe ................ G02B 7/1824
                                                          248/298.1
7,301,479 B2   11/2007 Regan
7,378,947 B2   5/2008 Luna et al.
(Continued)

FOREIGN PATENT DOCUMENTS

KR    20130059702    11/2011

Primary Examiner — Steven Lim
Assistant Examiner — Hongmin Fan
(74) Attorney, Agent, or Firm — James P. Muraff; Neal, Gerber & Eisenberg LLP

(57) ABSTRACT

This disclosure generally relates to a vehicle blind spot detection system, method, and module for adjusting parameters of a vehicle blind spot detection algorithm based on a trailer being attached to the back of the vehicle. More specifically, based on a determination that a trailer is attached to the vehicle and the reception of trailer information corresponding to the attached trailer, an adjust to the parameters of a blind spot detection area is disclosed for ensuring the continued operation of the blind spot detection feature will take into account the attached trailer.

16 Claims, 5 Drawing Sheets

(51) Int. Cl.
*G01S 15/87* (2006.01)
*G01S 15/93* (2006.01)

(56) References Cited

U.S. PATENT DOCUMENTS

| | | |
|---|---|---|
| 7,501,938 B2 | 3/2009 | Widmann et al. |
| 8,493,236 B2 | 7/2013 | Boehme et al. |
| 8,576,115 B2 | 11/2013 | Basten |
| 8,618,955 B2 | 12/2013 | Baker |
| 2005/0200700 A1* | 9/2005 | Schofield ............... B60R 1/00 348/148 |
| 2010/0156667 A1* | 6/2010 | Bennie ................ B60C 23/009 340/902 |
| 2012/0206275 A1* | 8/2012 | Mauderer ............ G01S 13/931 340/901 |
| 2013/0027195 A1* | 1/2013 | Van Wiemeersch .. B60W 30/12 340/431 |
| 2013/0038436 A1* | 2/2013 | Brey ....................... B60T 7/16 340/431 |
| 2013/0169425 A1 | 7/2013 | Victor et al. |
| 2015/0149040 A1 | 5/2015 | Hueger et al. |
| 2016/0107583 A1 | 4/2016 | Krishnan et al. |

* cited by examiner

VEHICLE BLIND SPOT SYSTEM OPERATION WITH TRAILER TOW

TECHNICAL FIELD

This disclosure generally relates to a vehicle blind spot detection system that is further configured to adjust for conditions where a trailer is attached to the back of the vehicle. More specifically, the vehicle blind spot detection system includes a computing system configured to determine when a trailer is attached to the vehicle, and further configured to adjust the parameters of the vehicle blind spot detection system to continue a blind spot detection feature while taking into account the attached trailer. These and other features will be described in more detail throughout this disclosure.

BACKGROUND

A vehicle may include a blind spot detection system comprised of two or more blind spot detection sensors for detecting whether objects are present within a blind spot area relative to the vehicle (e.g., a vehicle's left side and/or right side blind spot area). When one or more of the blind spot detection sensors positively detect an object within the blind spot area, a signal may be generated intended to warn a driver about the object within the blind spot area. In order to effectively operate such a blind spot detection system, the vehicle should have an accurate understanding of its own physical dimensions as well as the dimensions of its surrounding blind spot areas in order to effectively identify objects that may stray into the vehicle's blind spot areas.

However, when vehicles are modified to include available attachments, the blind zone of the overall vehicle system that includes the new attachment changes from the blind zone dimensions of the vehicle alone.

SUMMARY

It follows that in such situations where attachments are added to the vehicle, adjustments to the vehicle's blind spot detection system may be needed to continue to provide accurate blind spot detection.

Exemplary embodiments provide a blind spot detection system ("BSD system") on a vehicle comprised of one or more blind spot detection sensors. The blind spot detection system may include a blind spot detection tool ("BSD tool") running, at least in part, on a computing system that is part of a vehicle. The BSD tool may be configured to receive sensor information identifying whether an object is present within a defined blind spot area that surrounds the vehicle. Further, the BSD tool may receive trailer information when a trailer attachment is attached to the vehicle. Based on the received trailer information, the BSD tool may adjust the parameters of the blind spot area utilized by a blind spot detection algorithm to take into account the added presence of the trailer. According to some embodiments, the BSD tool may be controlled to operate within a targeted rate of false and/or mistaken object detection within the adjusted blind spot detection areas (e.g., the targeted rate may be less than 5% false and/or mistaken object detection within the adjusted blind spot detection areas). In this way, the BSD tool may adjust the parameters of the blind spot area to account for the added presence of the trailer, while also limiting the false and/or mistaken detection of objects within the adjusted blind spot area to be within the targeted rate.

It follows that according to some embodiments, a blind spot detection system of a vehicle is provided. The system may comprise a plurality of object sensors configured to detect an object within a blind spot detection area; an interface configured to receive trailer information; and a processor in communication with the plurality of object sensors and interface. The processor may be configured to detect a trailer attached to the vehicle; obtain the trailer information; and adjust the blind spot detection area based on the trailer information.

According to some embodiments, a method for operating a blind spot detection system of a vehicle is provided. The method may comprise receiving, by a processor, detection information identifying a trailer is attached to the vehicle; obtaining, by the processor, trailer information; and adjusting a blind spot detection area based on the trailer information, wherein a plurality of object sensors are configured to detect an object within the blind spot detection area.

According to some embodiments, an object detection module is provided. The object detection module may be comprised of an object sensor configured to detect an object within a blind spot detection area and a processor in communication with the object sensor. The processor may be configured to: detect a trailer attachment to a vehicle; receive trailer information; and adjust the blind spot detection area based on the trailer information.

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
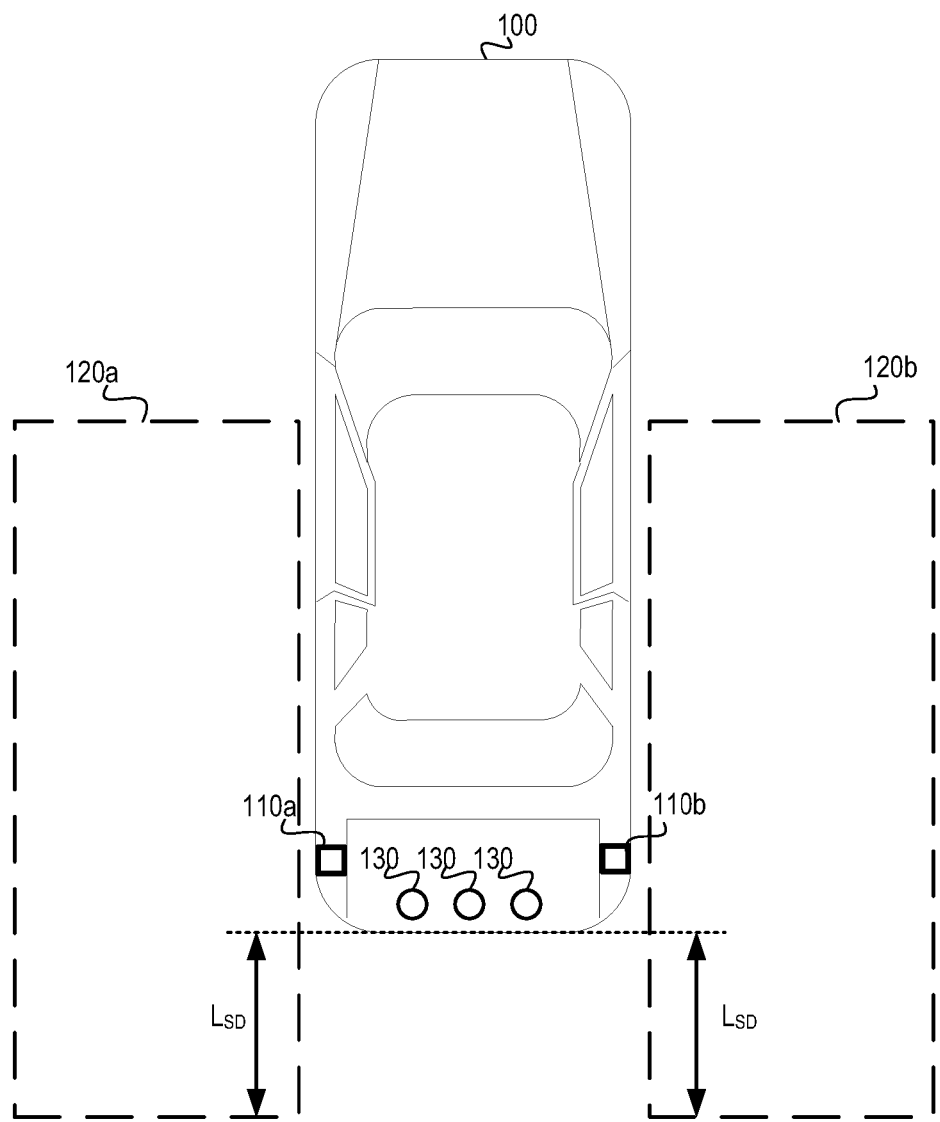
FIG. 1 illustrates an exemplary vehicle blind spot detection system including vehicle sensors, as well as a defined blind spot area, according to some embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

The vehicle 100 illustrated in FIG. 1 is configured to include a BSD system for detecting objects that are present within one or more designated blind spot areas. The BSD system may include a driver-side blind spot detection sensor 110a ("driver-side BSDS") and a passenger-side blind spot detection sensor 110b ("passenger-side BSDS"). The driver-side BSDS 110a may be configured to sense objects that are present within a driver-side blind spot detection area 120a ("driver-side BSDA"). The passenger-side BSDS 110b may be configured to sense objects that are present within a passenger-side blind spot detection area 120b ("passenger-side BSDA"). The driver-side BSDS 110a and the passenger-side BSDS 110b may be a radar based object sensor, a lidar based object sensor, an electromagnetic based proximity object sensor, an ultrasonic based proximity object sensor, or other like type of sensor capable of detecting objects and measuring a distance of such detected objects from the vehicle 100. According to some embodiments, the driver-side BSDS 110a may be an object detection module further comprised of an object sensor, a processor, memory, and connection buses configured to receive information (e.g., information corresponding to sensed objects within the driver-side BSDA 120a, or received trailer information as described herein) and adjust the driver-side BSDA 120a according to any one or more of the BSDA adjustment methods described herein. Similarly, according to some embodiments, the passenger-side BSDS 110b may be an object detection module comprised of an object sensor, a processor, memory, and connection buses configured to receive information (e.g., information corresponding to sensed objects within the passenger-side BSDA 120b, or received trailer information as described herein) and adjust the passenger-side BSDA 120b according to any one or more of the BSDA adjustment methods described herein.

Although the BSD system illustrated in FIG. 1 is described as including the driver-side BSDS 110a and the passenger-side BSDS 110b, it is within the scope of the BSD system described herein to include fewer, or more, such blind spot detection sensors. Further, although the driver-side BSDA 120a and the passenger-side BSDA 120b are illustrated in FIG. 1 to take on the rectangular shape, it is within the scope of the BSD system described herein to create a blind spot detection area that takes on different forms and/or shapes. For instance, the blind spot detection area created by the BSD system may take on a more radial shape to correspond to a sensing range for the driver-side BSDS 110a and the passenger-side BSDS 110b.

FIG. 1 illustrates the driver-side BSDS 110a and the passenger-side BSDS 110b as exemplarily being located in a rear section of the vehicle 100. However, in other embodiments the driver-side BSDS 110a and the passenger-side BSDS 110b may be located at other positions on the vehicle 100. For example, the driver-side BSDS 110a and the passenger-side BSDS 110b may be located on a driver-side rearview mirror and a passenger-side rearview mirror, respectively. Other locations for the driver-side BSDS 110a and the passenger-side BSDS 110b are also within the scope of the BSD system describe herein.

It is also within the scope of the BSD system of this disclosure to control the driver-side BSDS 110a and the passenger-side BSDS 110b to create blind spot detection areas that take on other forms and/or shapes that may be created within the range of the driver-side BSDS 110a and the passenger-side BSDS 110b.

The BSD system may also include, or utilize, one or more rear parking sensors 130. The rear parking sensors 130 may, for example, be an electromagnetic based proximity sensor, or an ultrasonic based proximity sensor. Further, although the BSD system illustrated in FIG. 1 is described as including three rear parking sensors 130, it is within the scope of the BSD described herein to include a fewer, or greater, number of such rear parking sensors 130.

The features described herein may be implemented by a BSD tool running, at least in part, on the vehicle 100. The BSD tool may be a program, application, and/or some combination of software and hardware that is incorporated on one or more of the components that comprise the vehicle's operating system. Further description for the BSD tool and the components of the vehicle system running the BSD tool is described in more detail below.

The vehicle 100 illustrated in FIG. 1 includes the BSD system, and is also understood to be running the BSD tool to implement the driver-side BSDA 120a to have an original length of $L_{Og}$. Similarly, the vehicle 100 is understood to be running the BSD tool to implement the passenger-side BSDA 120b to have an original length of $L_{Og}$. The original length of the blind spot detection areas 120a and 120b, $L_{Og}$, is determined to have a form or shape according to any of the methods described herein. Further, the BSD tool may be configured to control the original length, $L_{Og}$, to be required to at least extend a predetermined standard length, $L_{SD}$, beyond the rear of the vehicle 100. This standard distance $L_{SD}$ may, for example, be set to be 3 meters. The standard distance $L_{SD}$ may be determined based on a requirement adopted from a known standard for blind spot detection and/or lane change assistance (e.g., ISO 17387) that calls for a minimum distance from the rear of a vehicle and/or attachment attached to the vehicle that a blind spot detection area should reach. In some embodiments, a passenger may be allowed to input commands for setting the standard distance $L_{SD}$ within a range of allowable lengths. For example, a passenger may further extend the 3 meter standard distance $L_{SD}$ to a greater distance in order to extend the blind spot detection area, but the passenger may not be allowed to further decrease the 3 meter standard distance $L_{SD}$ which may be understood to be the minimum distance in which the blind spot detection area should extend from the rear of the vehicle and/or attachments from the vehicle.

Figure 2:
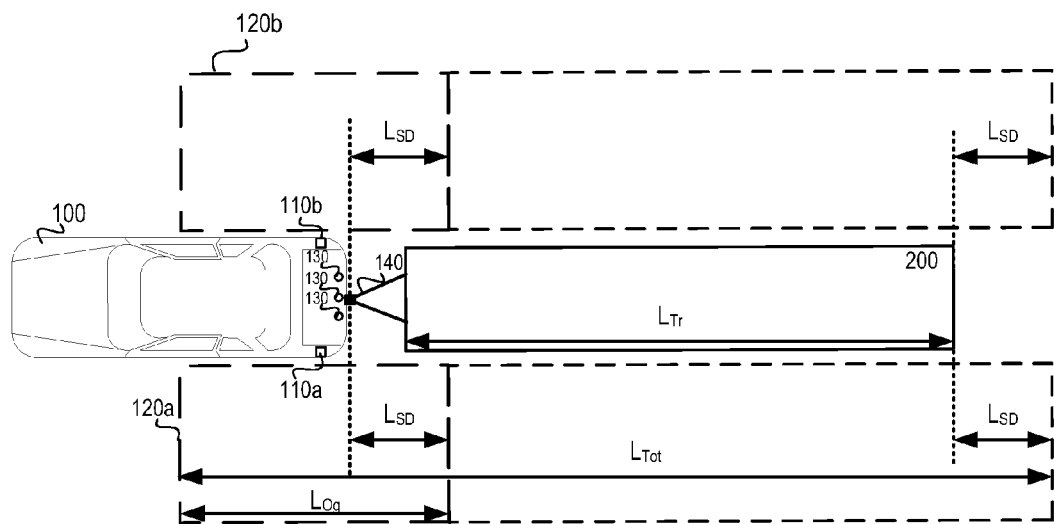
FIG. 2 illustrates an exemplary vehicle blind spot detection system operating with an attached trailer, according to some embodiments.

FIG. 2 illustrates the vehicle 100 having a trailer 200 attached to the vehicle 100 via a trailer hitch 140. The BSD system from FIG. 1 is also described as being included on the vehicle 100 illustrated in FIG. 2. The vehicle 100 illustrated in FIG. 2 includes the BSD system, and is also understood to be running the BSD tool in order to operate the features of the BSD system. Further description is provided below.

The trailer 200 illustrated in FIG. 2 is shown to have a length of $L_{Tr}$. When the trailer 200 is attached to the vehicle 100, the operational dimension of a vehicle system that includes the vehicle 100 and the trailer 200 increases. More specifically, the vehicle system's length increases from just the length of the vehicle prior to the trailer attached, to a total length of the vehicle length, trailer length ($L_{Tr}$), and a length for the trailer hitch 140 when the trailer 200 is attached. It follows that if the BSD tool is to maintain the requirements of maintaining the requirement to have blind spot detection areas that detect objects that are at least a minimum standard distance $L_{SD}$ from the rear of the vehicle system, the BSD tool will need to modify certain parameters of the blind spot detection system.

For instance, the BSD tool may receive inputs indicating that the trailer 200 is attached to the vehicle 100. Then based on the receipt of such inputs identifying the trailer 200 being attached to the vehicle, the BSD tool may recognize that an adjustment to the parameters of an algorithm being utilized for controlling the operation of the BSD system may be needed. The BSD tool may, for example, receive an attachment confirmation signal from a trailer module configured to transmit the attachment confirmation signal when the trailer 200 is connected to a trailer interface of the vehicle 100. The trailer module may automatically transmit the attachment confirmation signal when the trailer 200 is connected to the trailer interface of the vehicle 100 without a prompt from the vehicle 100.

In other embodiments, the BSD tool may recognize the trailer 200 is attached to the vehicle 100 when the BSD tool detects the trailer 200 is connected to the vehicle 100 via the trailer interface of the vehicle 100. For example, the BSD tool may be observing a circuitry within the vehicle in order to detect a current interruption within the circuitry of the vehicle caused by the additional load of the trailer 200 being connected to the trailer interface of the vehicle 100. When an interruption, or other change in load, is detected on the circuitry, the BSD tool may determine that the trailer 200 has been attached to the vehicle 100.

In other embodiments, the BSD tool may receive an input from a passenger of the vehicle 100 inputting such inputs into a control interface within the vehicle cabin. The passenger's input may indicate to the BSD that the trailer 200 has been attached.

In other embodiments, at least one of the driver-side BSDS 110a or the passenger-side BSDS 110b may be utilized to recognize the trailer 200 being positioned behind the vehicle 100. For example, in a situation where a trailer module is not available or is not functioning properly, the driver-side BSDS 110a and/or the passenger-side BSDS 110b may sense the trailer 200 as being positioned behind the vehicle 100 and transmit sensor information describing the trailer 200 to the BSD tool running on a computing device of the vehicle 100. The BSD tool may then receive the sensor information, analyze the sensor information, and determine that the trailer 200 is attached to the vehicle 100 based on a recognition of the trailer 200 from the sensor information received from the driver-side BSDS 110a and/or the passenger-side BSDS 110b. The analysis may be able to detect a presence of the trailer 200 behind the vehicle 100, and may further detect a size or shape of the trailer 200 to determine that the object behind the vehicle 100 is likely a trailer.

In addition, according to some embodiments the BSD tool may further rely on rear parking sensors 130 to confirm that the trailer 200 is attached to the vehicle 100. For instance, in a situation where a trailer module is not available or is not functioning properly, the BSD tool may receive sensor information from the rear parking sensors 130, analyze the sensor information, and determine the trailer 200 is attached to the vehicle 100 based on the analysis. The analysis may be able to detect a presence of the trailer 200 behind the vehicle 100, and may further detect a size or shape of the trailer 200 to determine that the object behind the vehicle 100 is likely a trailer. According to some embodiments, the rear parking sensors 130 alone may be utilized by the BSD tool to detect the attachment of the trailer 200 to the vehicle 100. In other embodiments, the driver-side BSDS 110a and/or the passenger-side BSDS 110b may be employed by the BSD tool to first detect the presence of the trailer 200 as described above, and then the rear parking sensors 130 may be additionally employed by the BSD tool to provide auxiliary information for confirming the presence of the trailer 200 as first detected by the driver-side BSDS 110a and/or the passenger-side BSDS 110b.

After receiving the signal indicating the trailer 200 has been attached to the vehicle 100, the BSD tool may receive trailer information identifying, for example, the dimensions of the trailer 200 (e.g., width, length, height information). In some embodiments, the BSD tool may receive the trailer information based on inputs from a passenger of the vehicle 100 inputting such inputs into a control interface within the vehicle cabin. The passenger's input may identify the dimensional information for the trailer 200.

In addition or alternatively, the passenger's input may identify a model number/identification of the trailer 200. In such embodiments, the BSD tool may compare the trailer model number/identification against a database of trailer information. If the BSD tool is able to find a matching entry in the trailer database based on the received trailer model/identification information, the BSD tool may look up the trailer information that corresponds to the matched trailer model/identification information in the trailer database, and reference the corresponding trailer information from the trailer database as the trailer information for the attached trailer 200. The trailer database may be stored on a memory storage unit that is included as part of a computing system running the BSD tool.

According to some embodiments, the trailer information may be obtained via an automatic process. After receiving the signal indicating the trailer 200 has been attached to the vehicle 100, the BSD tool may receive trailer model number/identification information from a module of the trailer 200. The BSD tool may compare the trailer model number/identification against a database of trailer information. If the BSD tool is able to find a matching entry in the trailer database based on the received trailer model/identification information, the BSD tool may look up the trailer information that corresponds to the matched trailer model/identification information in the trailer database, and reference the corresponding trailer information from the trailer database as the trailer information for the attached trailer 200. The trailer database may be stored on a memory storage unit that is included as part of a computing system running the BSD tool.

In addition or alternatively, the BSD tool running on a computing system included on the vehicle 100 may directly receive information identifying the dimensions of the trailer 200 from a module on the trailer 200.

After obtaining the trailer information according to any one of the methods described herein, the BSD tool may adjust one or more blind spot detection parameters based on the obtained trailer information. For example, in terms of creating one or more blind spot detection areas, the BSD tool may adjust the operational length of the vehicle 100 to be an operational length of a vehicle system comprised of the vehicle 100 and trailer 200. It follows that the blind spot detection area may be adjusted to account for the attached trailer 200. So whereas the blind spot detection area may have been operated to detect objects at least a standard distance ($L_{SD}$) from the rear of the vehicle 100 and beyond, the BSD tool may adjust the parameters of the blind spot detection areas to detect objects at least a standard distance ($L_{SD}$) from the rear of the trailer 200 and beyond.

So with reference to the exemplary vehicle system illustrated in FIG. 2, the length of the driver-side and passenger-side BSDA 120a and 120b may be extended from $L_{Og}$ to $L_{Tot}$ to take into account, at least, the added length ($L_{Tr}$) of the trailer 200. It should be noted that in some embodiments, the length of the trailer hitch 140 may also be taken into account when generating the new total length $L_{Tot}$ of the blind spot areas 120a and 120b. Information identifying the length of the trailer hitch 140 may be obtained according to any one or more of the methods described for obtaining the trailer information described herein.

Figure 3:
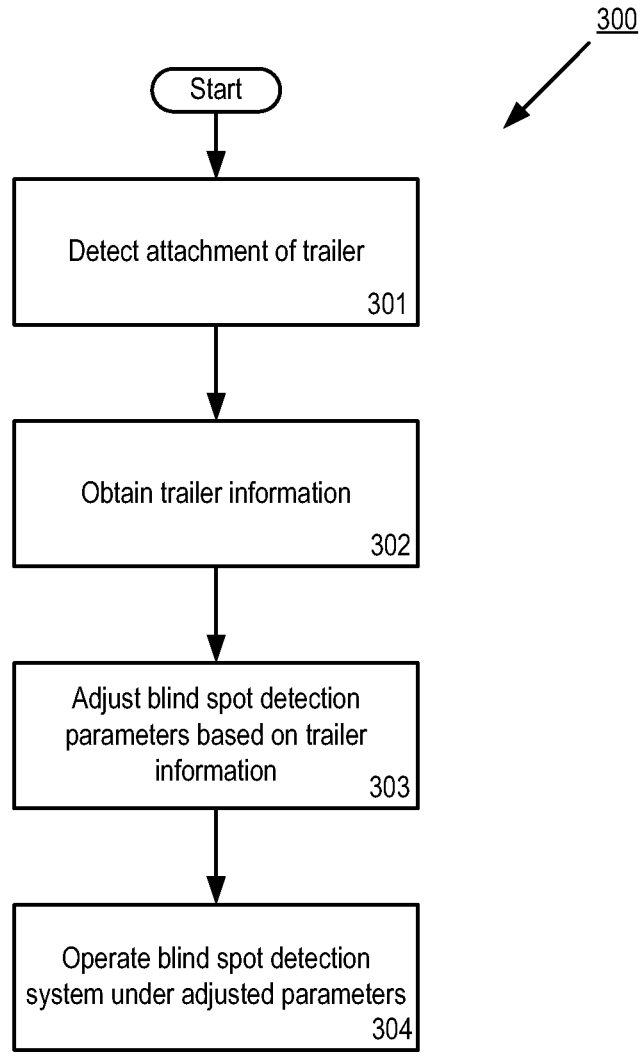
FIG. 3 illustrates an exemplary flowchart describing a process implemented by a blind spot detection tool, according to some embodiments.

FIG. 3 illustrates a flowchart 300 that describes a process for adjusting a parameter referenced by the BSD tool during a blind spot detection operation. The BSD tool may be running on a computing system (e.g., computing system 500 described with reference to FIG. 5) that is part of a vehicle that further includes a BSD system as described herein. In addition or alternatively, according to some embodiments the BSD tool may be running on an object detection module (e.g., the driver-side BSDS 110a and/or passenger-side BSDS 110b according to some embodiments) as described herein.

At 301, the BSD tool may detect the attachment of a trailer to the vehicle. The detection of the trailer attachment may be made by the BSD tool according to any one or more of the methods described herein.

Figure 4:
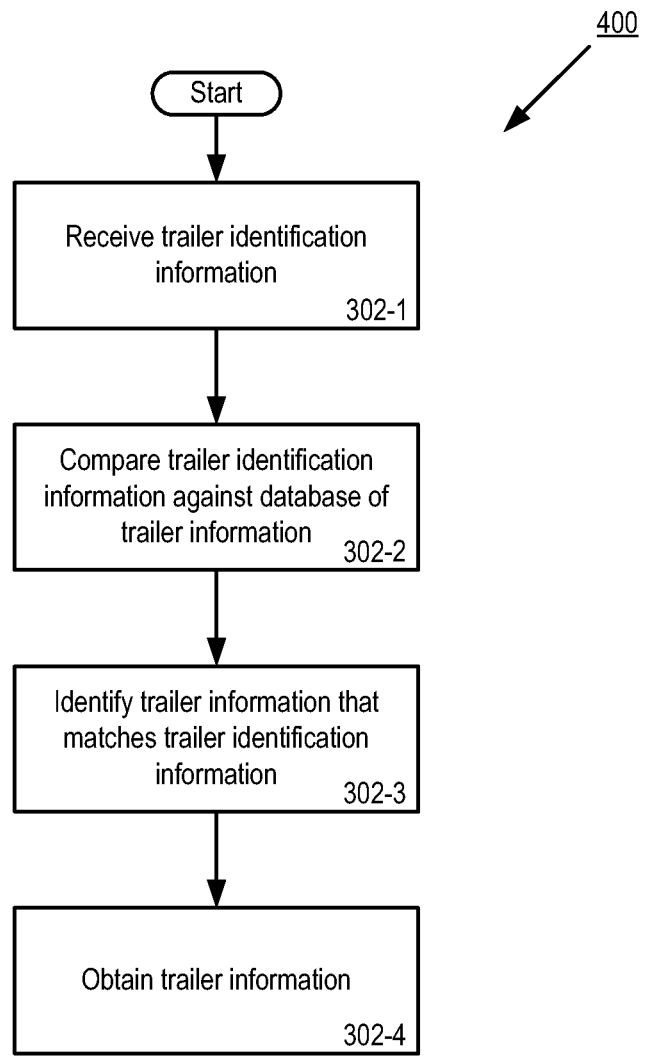
FIG. 4 illustrates an expansion for a step provided in the flowchart of FIG. 3, according to some embodiments.

At 302, the BSD tool may obtain trailer information. The trailer information may include, at least, information identifying the dimensions of the attached trailer. Further, the trailer information may be obtained according to any one or more of the methods described herein. For example, FIG. 4 illustrates a flow chart 400 that is an expanded view of exemplary steps that may comprise obtaining trailer information.

At 302-1 the BSD tool may receive trailer identification information. The trailer identification information may be obtained from a module of the attached trailer, or from inputs directly received from a passenger. At 302-2, the BSD tool may compare trailer identification information against a database of trailer information, as described in more detail herein. Then at 302-3, the BSD tool may identify trailer information from the trailer database that matches the received trailer identification information, as described in more detail herein. Then at 302-4, the trailer information identified at 302-3 may be referenced by the BSD tool as the obtained trailer information.

At 303, the BSD tool may adjust a parameter referenced by the BSD tool for operating the BSD system. For example, the BSD tool may determine a new operational length for a vehicle system that includes the vehicle and the attached trailer, and adjust a referenced length of one or more blind spot detection areas based on the length of the newly determined vehicle system. The adjustment of the length of the blind spot detection areas may be made according to any one or more of the methods described herein.

At 304, the BSD tool may continue to operate the BSD system by referencing the adjusted parameter information. By utilizing the extended blind spot detection area, the BSD tool may take into account the attachment of the trailer in order to prevent, or at least minimize, misinterpreting the detection of the trailer by one or more blind spot detection sensors within an area surrounding the vehicle as a foreign object to be avoided. For instance, without adjusting the parameters to take into account the additional length of the attached trailer to the vehicle system, the BSD tool may have mistaken portions of the attached trailer as a foreign object within the blind spot detection area. This scenario may come into play when the vehicle engages in lane changing maneuvers where portions of the trailer may not be in line with the vehicle. It follows that by extending the blind spot detection areas to account for the attached trailer as described herein, the BSD tool may prevent, or at least reduce, the occurrence of false warning messages being generated based on the detection of the trailer within a blind spot detection area.

It follows that beginning at 304, the BSD tool may detect objects within the extended blind spot detection area. For instance with reference to FIG. 2, according to the process described by flowchart 300, the vehicle 100's driver-side BSDA 120a and/or passenger-side BSDA 120b may be extended from the original length $L_{Og}$ to the extended total length $L_{Tot}$ that extends a set distance $L_{SD}$ (e.g., 3 meters) behind the end of the attached trailer 200. It follows that when an object is detected within the extended driver-side BSDA 120a and/or passenger-side BSDA 120b, a signal may be generated by the computing system running the BSD tool.

The signal may control a display within the vehicle cabin to display a warning message identifying an object within the extended driver-side BSDA 120a and/or passenger-side BSDA 120b. Further, the signal may control an indicator (e.g., LED lighting indicator) located outside of the vehicle cabin (e.g., located on one or more of the driver-side and/or passenger-side outside rear view mirrors) to activate in order to indicate an object is within the extended driver-side BSDA 120a and/or passenger-side BSDA 120b.

In addition or alternatively, the signal may control an audio output device (e.g., speaker) within the vehicle cabin to output an audio noise indicating an object has been detected within the extended driver-side BSDA 120a and/or passenger-side BSDA 120b.

In addition or alternatively, the signal may control one or more vehicle systems on the vehicle 100 such as, for example, controlling a cruise control system to change from an engaged state to a disengaged state when an object is identified in the extended driver-side BSDA 120a and/or passenger-side BSDA 120b and, in some embodiments, when the vehicle is detected to be turning into an adjacent area (e.g., adjacent driving lane) where the object is identified.

In addition or alternatively, the signal may control one or more vehicle systems on the vehicle 100 such as, for example, controlling a vehicle braking system to engage when an object is identified in the extended driver-side BSDA 120a and/or passenger-side BSDA 120b and, in some embodiments, when the vehicle is detected to be turning into an adjacent area (e.g., adjacent driving lane) where the object is identified.

In addition or alternatively, the signal may control one or more vehicle systems on the vehicle 100 such as, for example, controlling a vehicle steering system to return to a driving lane driver-side BSDA 120a and/or passenger-side BSDA 120b and, in some embodiments, when the vehicle is detected to be turning into an adjacent area (e.g., adjacent driving lane) where the object is identified.

The steps identified in the flowchart 300 are provided for exemplary purposes only, as additional, or fewer, steps may be included in a process for adjusting one or more parameters referenced by the BSD tool when operating a blind spot detection feature of the BSD system.

Figure 5:
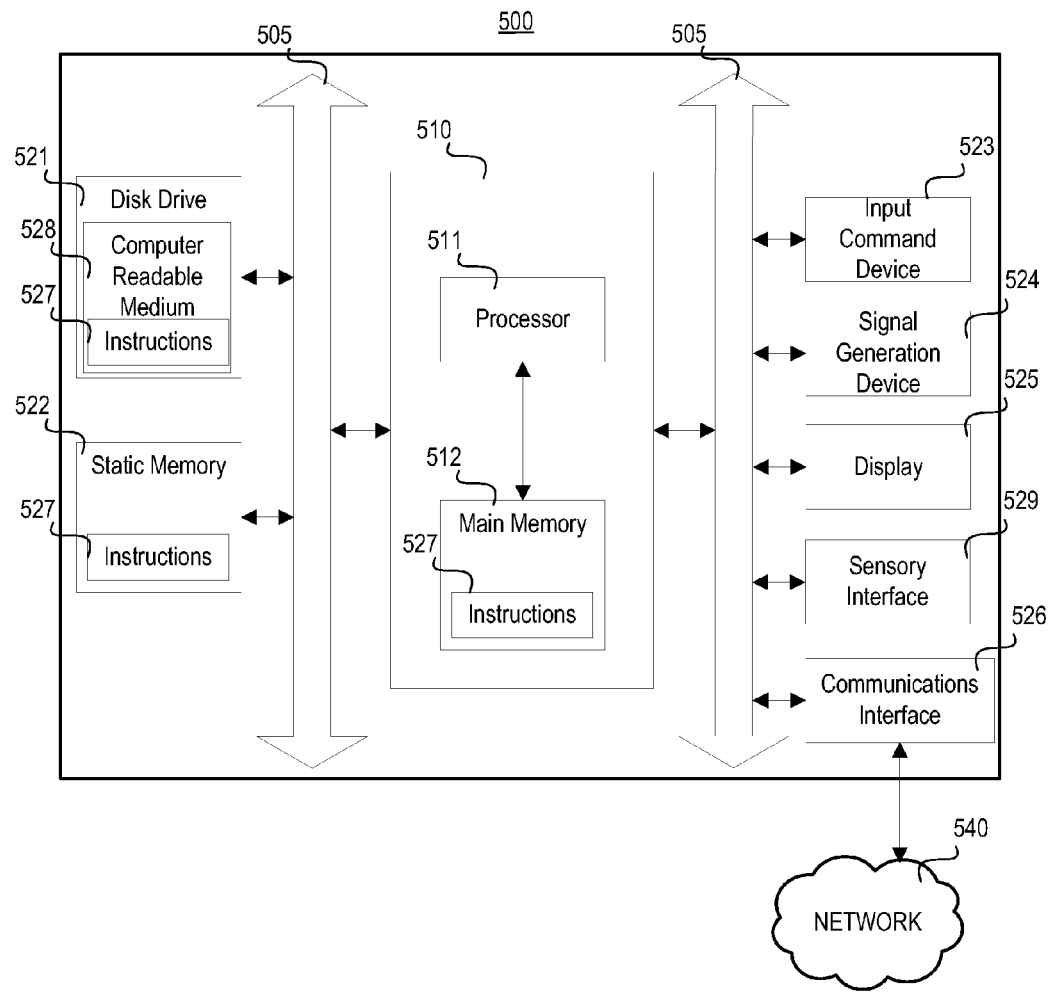
FIG. 5 illustrates an exemplary computer system included in a vehicle, according to some embodiments.

Referring to FIG. 5, an illustrative embodiment of a computing system 500 that may be used for carrying out any one or more of the methods, features, and processes discussed herein. For example, the computing system 500 may be housed within a vehicle and represent the functional components of the vehicle needed to implement the BSD tool described herein.

The computing system 500 may include a processing unit 510 comprised of a processor 511 in communication with a main memory 512, wherein the main memory 512 stores a set of instructions 527 that may be executed by the processor 511 to cause the computing system 500 to perform any one or more of the methods, processes or computer-based functions disclosed herein. For example, the BSD tool described throughout this disclosure may be a program that is comprised of a set of instructions 527 that are executed to perform any one or more of the methods, processes or computer-based functions described herein such as the processes for determining the proper adjustments to a parameter during a blind spot detection feature in view of a trailer attached to the vehicle. Further, while a single computing system 500 is illustrated, the term "system" shall also be taken to include any collection of systems or sub-systems that individually or jointly execute a set, or multiple sets, of instructions to perform one or more computer functions.

As illustrated in FIG. 5, the computing system 500 may include the processor 511, such as a central processing unit ("CPU"), a graphics processing unit ("GPU"), or both. Moreover, the computing system 500 can include the main memory 512 and a static memory 522 (alternatively, a volatile type of memory may also be used in place of, or in addition to, the static memory 522) that can communicate with each other via a bus 505. As shown, the computing system 500 may further include a display unit 525, such as a liquid crystal display ("LCD"), an organic light emitting diode ("OLED"), a flat panel display, a solid state display, or a cathode ray tube ("CRT"). The display unit 525 may correspond to a display component of a navigation system, vehicle infotainment system, a heads-up display, or instrument panel of the vehicle configured to display prompts to a passenger to input information, or display warning messages generated by the BSD tool. Additionally, the computing system 500 may include one or more input command devices 523, such as a control knob, instrument panel, keyboard, scanner, digital camera for image capture and/or visual command recognition, touch screen or audio input device, buttons, a mouse or touchpad. For example, a passenger may utilize the input command devices 523 to input commands and information (e.g., trailer information) to be received by the BSD tool as described herein.

The computing system 500 can also include a disk drive unit 521 for receiving a computer-readable medium 528. In a particular embodiment, the disk drive unit 521 may receive the computer-readable medium 528 in which one or more sets of instructions 527, such as the software corresponding to the BSD tool, can be embedded. Further, the instructions 527 may embody one or more of the methods or logic as described herein. In a particular embodiment, the instructions 527 may reside completely, or at least partially, within any one or more of the main memory 512, the static memory 522, computer readable medium 528, and/or within the processor 511 during execution of the instructions 527 by the processor 511. The computer-readable medium 528 can include a solid-state memory such as a memory card or other package that houses one or more non-volatile read-only memories, such as flash memory. Further, the computer-readable medium 528 can be a random access memory or other volatile re-writable memory. Additionally, the computer-readable medium 528 can include a magneto-optical or optical medium, such as a disk or tapes or other storage device to capture information communicated over a transmission medium. Accordingly, the disclosure is considered to include any one or more of a computer-readable medium 528 or a distribution medium and other equivalents and successor media, in which data or instructions may be stored.

The computing system 500 may also include a signal generation device 524, such as a speaker or remote control, and a sensory interface 529. The sensory interface 529 may be configured to receive information obtained by one or more vehicle sensors that are part of the vehicle system. For example, the sensory interface 529 may be configured to receive information from one or more blind spot detection sensors and one or more rear parking sensors, as described herein.

The computing system 500 may further include a communications interface 526. The communications interface 526 may be comprised of a network interface (either wired or wireless) for communication with an external network 540. The external network 540 may be a collection of one or more networks, including standards-based networks (e.g., 2G, 3G, 4G, Universal Mobile Telecommunications System (UMTS), GSM® Association, Long Term Evolution (LTE)™, or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the external network 540 may be a public network, such as the Internet, a private network, such as an intranet, or combinations thereof, and may utilize a variety of networking protocols now available or later developed including, but not limited to TCP/IP based networking protocols. The communications interface 526 may also be an interface (e.g., trailer interface) for communicating with a trailer module through either a wired or wireless connection protocol, as described herein. Therefore, the information received from the trailer module may be received via the communications interface 526.

In some embodiments the program that embodies the BSD tool, and/or updates to the BSD tool, may be downloaded and stored on any one or more of the main memory 512, computer readable medium 528, or static memory 522 via transmission through the network 540 from an off-site server. Further, in some embodiments the BSD tool running on the computing system 500 may communicate with an information server via the network 540.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle comprising:
a body, a motor, brakes, a trailer-hitch, a processor coupled to sensors and configured to:
detect a hitched trailer, and in response:
   sum individually recalled trailer-hitch, trailer, buffer, and vehicle lengths;
   identify position(s) of object(s) based the sensors' signals;
   automatically trigger a first response only when the position(s) are within the summed length;
   only enable user-adjustment of the buffer length above a preset standard length.

2. The vehicle of claim 1, wherein the first response includes automatically deactivating the vehicle's cruise control.

3. The vehicle of claim 1, wherein the first response includes flashing a light mounted on a rear-view mirror of the body.

4. The vehicle of claim 2, wherein the processor is configured to only trigger the first response when the processor detects a vehicle lane change.

5. The vehicle of claim 4, wherein the vehicle lane change is the vehicle steering into a lane having identified object(s).

6. The vehicle of claim 1, wherein the detection length is parallel to a longitudinal axis of the vehicle.

7. The vehicle of claim 1, wherein the recalled vehicle length is a longitudinal length from at least one of the sensors to a rear surface of the vehicle.

8. The vehicle of claim 1, wherein the processor is configured to assess signals from at least two discrete sensors to detect the hitched trailer.

9. A method of operating a vehicle having a body, a motor, brakes, a trailer-hitch, and a processor coupled to sensors, comprising, with the processor:
detecting a hitched trailer, and in response:
   summing individually recalled trailer-hitch, trailer, buffer, and vehicle lengths;
   identifying position(s) of object(s) based the sensors' signals;
   automatically triggering a first response only when the position(s) are within the summed length;
   only enabling user-adjustment of the buffer length above a preset standard length.

10. The method of claim 9, wherein the first response includes automatically deactivating the vehicle's cruise control.

11. The method of claim 9, wherein the first response includes flashing a light mounted on a rear-view mirror of the body.

12. The method of claim 10, wherein the processor is configured to only trigger the first response when the processor detects a vehicle lane change.

13. The method of claim 12, wherein the vehicle lane change is the vehicle steering into a lane having identified object(s).

14. The method of claim 9, wherein the detection length is parallel to a longitudinal axis of the vehicle.

15. The method of claim 9, wherein the recalled vehicle length is a longitudinal length from at least one of the sensors to a rear surface of the vehicle.

16. The method of claim 9, wherein the processor is configured to assess signals from at least two discrete sensors to detect the hitched trailer.

* * * * *

UNITED STATES PATENT AND TRADEMARK OFFICE
CERTIFICATE OF CORRECTION

PATENT NO.       : 9,493,117 B2
APPLICATION NO.  : 14/509876
DATED            : November 15, 2016
INVENTOR(S)      : Mark Alan Shehan et al.

It is certified that error appears in the above-identified patent and that said Letters Patent is hereby corrected as shown below:

On the Title Page

In item (73), please amend Assignee: "FORD GLOBAL TECHNOLOGIES, LLC, Dearborn, MI (US)" add --CONTINENTAL AUTOMOTIVE SYSTEMS, INC., Auburn Hills, MI (US)--

Signed and Sealed this
Second Day of January, 2018

Joseph Matal
*Performing the Functions and Duties of the*
*Under Secretary of Commerce for Intellectual Property and*
*Director of the United States Patent and Trademark Office*